United States Patent
Zhang et al.

(10) Patent No.: US 12,077,318 B2
(45) Date of Patent: Sep. 3, 2024

(54) INTELLIGENT SYSTEM FOR CONTROLLING DRIVING OF AIRCRAFT TOW TRACTOR BY MEANS OF COMBINATION OF VOICE AND VISION

(71) Applicant: Civil Aviation University of China, Tianjin (CN)

(72) Inventors: Wei Zhang, Tianjin (CN); Xiao Lv, Tianjin (CN); Jihao Liu, Tianjin (CN); Liwen Wang, Tianjin (CN)

(73) Assignee: Civil Aviation University of China (CN)

( * ) Notice: Subject to any disclaimer, the term of this patent is extended or adjusted under 35 U.S.C. 154(b) by 813 days.

(21) Appl. No.: 17/153,138

(22) Filed: Jan. 20, 2021

(65) Prior Publication Data

US 2021/0261271 A1    Aug. 26, 2021

(30) Foreign Application Priority Data

Feb. 26, 2020    (CN) .......................... 202010118624.9

(51) Int. Cl.
*B64F 1/223*    (2024.01)
*B60D 1/14*    (2006.01)
(Continued)

(52) U.S. Cl.
CPC ............... *B64F 1/224* (2013.01); *B60D 1/14* (2013.01); *B60D 1/242* (2013.01); *B64F 1/04* (2013.01);
(Continued)

(58) Field of Classification Search
CPC . B64F 1/224; B64F 1/04; G10L 15/22; G10L 2015/223
See application file for complete search history.

(56) References Cited

U.S. PATENT DOCUMENTS 10,867,522 B1 *  12/2020  Srivastav ............... B64D 47/08
2008/0071429 A1 *  3/2008  Kraimer ............... G05D 1/0033
701/2

(Continued)

OTHER PUBLICATIONS

Othman Khamis Juma, "Aircraft Marshalling and Push back Procedure", Mar. 1, 2015, https://youtu.be/SnPXq63shRo?si=hWUjjy9fyF9yyjah (Year: 2015).*

(Continued)

*Primary Examiner* — James M McPherson
*Assistant Examiner* — Clint Pham
(74) *Attorney, Agent, or Firm* — McDonald Hopkins LLC

(57) ABSTRACT

An intelligent system for controlling driving of an aircraft tow tractor by means of combination of voice and vision includes an audio transmission line, a voice recognition system, a visual recognition system, and a vehicle-mounted motion controller. According to the intelligent system, visual recognition is performed based on a belly-mounted anti-collision light on an aircraft, a taxi light, and the visual recognition system on an aircraft tow tractor, and the aircraft tow tractor is intelligently controlled by means of combination of voice recognition and the visual recognition; furthermore, the aircraft tow tractor is intelligently controlled by voices of flight crew via the audio transmission line, safety in a towing process is guaranteed by the visual recognition, and each step in the towing process is performed by means of a cross validation based on the voice recognition and the visual recognition.

4 Claims, 3 Drawing Sheets

(51) Int. Cl.
*B60D 1/24* (2006.01)
*B64F 1/04* (2024.01)
*G10L 15/22* (2006.01)

(52) U.S. Cl.
CPC ........ *G10L 15/22* (2013.01); *G10L 2015/223* (2013.01)

(56) References Cited

U.S. PATENT DOCUMENTS

2010/0140392 A1* 6/2010 Perry ................... B64F 1/22
                                                    244/50
2015/0134149 A1* 5/2015 De Mers ............. F16H 61/0202
                                                    701/3
2018/0281948 A1* 10/2018 Tao ..................... B64C 39/024

OTHER PUBLICATIONS

Joe Yoon, "Aircraft Lights & Beacons", Feb. 26, 2006, https://aerospaceweb.org/question/electronics/q0263.shtml (Year: 2006).*
Mototok, "factsheet-spacer-en", 2017, https://avrogse.com/wp-content/uploads/2017/07/factsheet-spacer-en.pdf (Year: 2017).*
Hikvision, "DS-IPC-B12-I(/PoE)", 2018, https://www.bjharc.com/products/dsipcb.html (Year: 2018).*

* cited by examiner

INTELLIGENT SYSTEM FOR CONTROLLING DRIVING OF AIRCRAFT TOW TRACTOR BY MEANS OF COMBINATION OF VOICE AND VISION

RELATED APPLICATIONS

This application claims priority to Chinese Patent Application No. 202010118624.9, filed on Feb. 26, 2020, which is incorporated herein by reference in its entirety.

TECHNICAL FIELD

The present disclosure relates to the technical field of special devices on the ground of airports, in particular to an intelligent system for controlling driving of an aircraft tow tractor by means of combination of voice and vision.

BACKGROUND

As auxiliary devices for towing aircrafts on the ground at airports, aircraft tow tractors are classified into aircraft tow tractors with tow bars and aircraft tow tractors without tow bars according to their different structures. The process of the aircraft tow tractors towing the aircrafts is critical for determining whether the aircraft tow tractors are excellent: and accordingly, whether the communication between the aircraft tow tractors and the aircrafts is convenient and smooth has a direct influence on the safety of support services for the aircrafts on the ground. Traditional aircraft tow tractors require the combination of drivers of the aircraft tow tractors, commanders, and pilots during towing. In this case, frequent communication is necessary. As a result, some accidents will be caused by such a complex towing process. To reduce the accidents, some semi-intelligent aircraft tow tractors have been put forward currently. PowerPush aircraft tow tractors from Germany allow drivers to walk out of their cabs after being locked with landing gears of the aircrafts, so that the drivers can walk in a safety range around the aircrafts to know the work environment clearly and then control the operation of the aircraft tow tractors by means of remote controllers. However, the drivers still need to communicate with the pilots. Consequently, the aircraft tow tractors cannot be intelligently controlled fully. TaxiBot aircraft tow tractors being tested by French aircraft tow tractor manufacturer TLD can be controlled by the pilots during towing after being fixed to the landing gears of the aircrafts; and in this way, the intelligent level of a control over the aircraft tow tractors is greatly improved. However, it is necessary to install a system integrating commands, controls, and communications on an air traffic control (ATC) tower and the aircraft tow tractors TaxiBot to make sure that the aircraft tow tractors operate safely and effectively, and this requires existing airport infrastructures to be modified to a certain extent.

SUMMARY

The present disclosure aims to settle the above issue by providing an intelligent system for controlling driving of an aircraft tow tractor by means of combination of voice and vision, which can improve the safety of connection.

To fulfill the above objective, the intelligent system for controlling driving of an aircraft tow tractor by means of combination of voice and vision is arranged on an aircraft tow tractor and an aircraft and includes an audio transmission line, a voice recognition system, a visual recognition system, and a vehicle-mounted motion controller, where a clamping device is arranged in the middle of an upper portion of the aircraft tow tractor: a nose landing gear provided with a taxi light is arranged on a front portion of a bottom surface of the aircraft: a belly-mounted anti-collision light is located in the middle of the bottom surface of the aircraft: the voice recognition system, the visual recognition system, and the vehicle-mounted motion controller are arranged on the aircraft tow tractor; the voice recognition system includes a voice processing device as well as a voice receiving device connected to the vehicle-mounted motion controller through the voice processing device: the visual recognition system includes a vision processing device as well as a vision acquisition device arranged on a top surface of a cab of the aircraft tow tractor and connected to the vehicle-mounted motion controller through the vision processing device, where a lens of the vision acquisition device is arranged backwards: and the audio transmission line has one end connected to the voice receiving device and the other end detachably connected into a headphone jack in a cockpit of the aircraft.

Any one of a main control chip TMS570LS3137/TMS570LS1224, a development board EVAL-L9788, a main control chip SPC574K72E7/SPC582B60E3, and a vehicle control unit (VCU-P) may be adopted as the vehicle-mounted motion controller in specific examples.

A Hikvision vision acquisition device DS-IPC-B12-I with 2 million pixels may be adopted as the vision acquisition device, for example.

The audio transmission line may be replaced with a wireless transmission device.

The intelligent system for controlling driving of an aircraft tow tractor by means of combination of voice and vision of the present disclosure can have one or more of the following beneficial effects:

Visual recognition is performed based on the belly-mounted anti-collision light on the aircraft, the taxi light, and the visual recognition system on the aircraft tow tractor, and the aircraft tow tractor is intelligently controlled by means of combination of voice recognition and the visual recognition; furthermore, the aircraft tow tractor is intelligently controlled by voices and spoken commands of flight crew via the audio transmission line, safety in a towing process is guaranteed by the visual recognition, and each step in the towing process is performed by means of a cross validation based on the voice recognition and the visual recognition: and in this way, accurate connection between the aircraft tow tractor and the aircraft is achieved, the towing process is simplified, the manpower is saved, and the safety and efficiency in the towing process are improved.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF DRAWINGS

In the accompanying drawings, reference characters refer to the same parts throughout the different views. The drawings are not necessarily to scale: emphasis has instead been placed upon illustrating the principles of the invention. Of the drawings.

DETAILED DESCRIPTION

The technical solution of the present disclosure is further described in detail with reference to the accompanying drawings.

Figure 1:
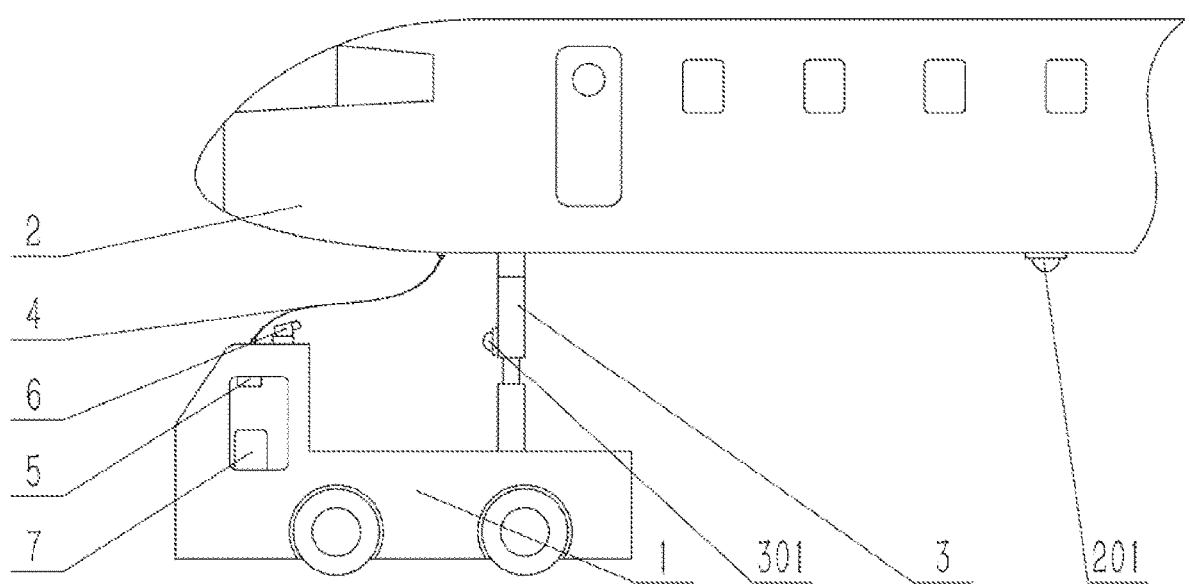
FIG. 1 is an overall schematic diagram of an intelligent system for controlling driving of an aircraft tow tractor by means of combination of voice and vision of the present disclosure.
Figure 2:
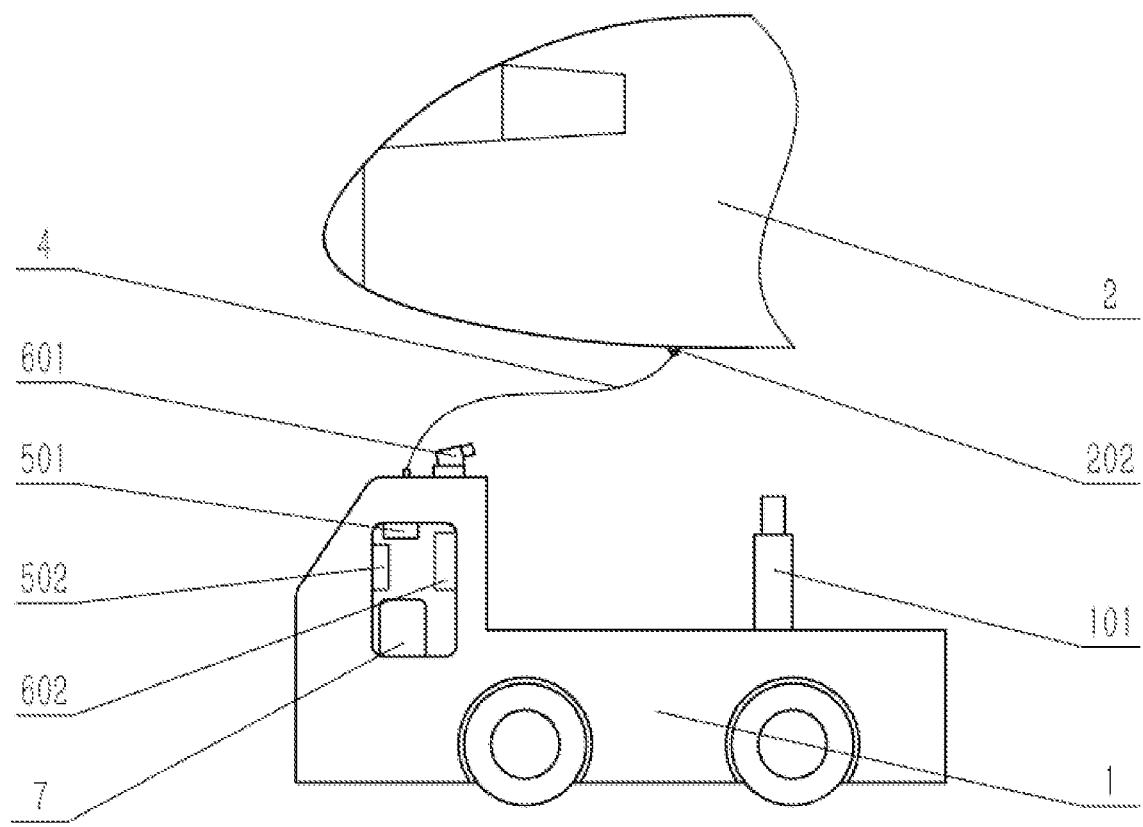
FIG. 2 is a partial schematic view of the intelligent system for controlling driving of an aircraft tow tractor by means of combination of voice and vision of the present disclosure.
Figure 3:
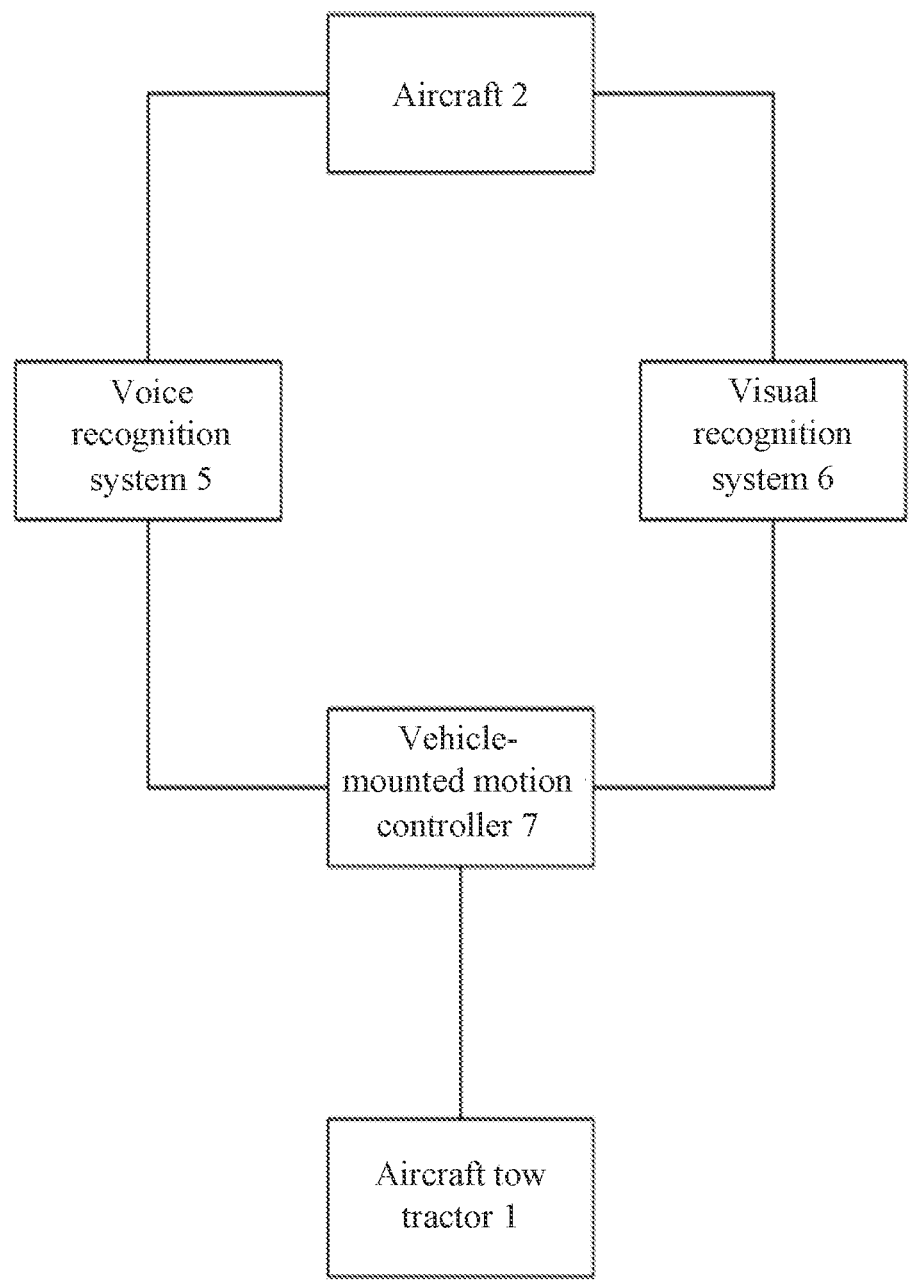
FIG. 3 is a structural block diagram of the intelligent system for controlling driving of an aircraft tow tractor by means of combination of voice and vision of the present disclosure.

As shown in FIG. 1-3, an intelligent system for controlling driving of an aircraft tow tractor by means of combination of voice and vision is arranged on an aircraft tow tractor 1 and an aircraft 2, where a clamping device 101 is arranged in the middle of an upper portion of the aircraft tow tractor 1: a nose landing gear 3 provided with a taxi light 301 is arranged on a front portion of a bottom surface of the aircraft 2: and a belly-mounted anti-collision light 201 is located in the middle of the bottom surface of the aircraft 2. Furthermore, the intelligent system for controlling driving of an aircraft tow tractor by means of combination of voice and vision includes an audio transmission line 4, a voice recognition system 5, a visual recognition system 6, and a vehicle-mounted motion controller 7, where the voice recognition system 5, the visual recognition system 6, and the vehicle-mounted motion controller 7 are arranged on the aircraft tow tractor 1; the voice recognition system 5 includes a voice processing device 502 as well as a voice receiving device 501 connected to the vehicle-mounted motion controller 7 through the voice processing device 502: the visual recognition system 6 includes a vision processing device 602 as well as a vision acquisition device 601 arranged on a top surface of a cab of the aircraft tow tractor 1 and connected to the vehicle-mounted motion controller 7 through the vision processing device 602, where a lens of the vision acquisition device 601 is arranged backwards: and the audio transmission line 4 has one end connected to the voice receiving device 501 and the other end detachably connected into a headphone jack 202 in a cockpit of the aircraft 2.

Any one of a main control chip TMS570LS3137/TMS570LS1224 from Texas Instruments (TI), a development board EVAL-L9788 from STMicroelectronics (ST), a main control chip SPC574K72E7/SPC582B60E3 from the ST, and a vehicle control unit (VCU-P) from BOSCH can be adopted as the vehicle-mounted motion controller 7.

A Hikvision vision acquisition device DS-IPC-B12-I with 2 million pixels is adopted as the vision acquisition device 601 in a current embodiment.

The audio transmission line 4 can be replaced with a wireless transmission device.

The operating principle of the intelligent system for controlling driving of an aircraft tow tractor by means of combination of voice and vision is as follows:

When the aircraft 2 needs to be towed by the aircraft tow tractor 1, the aircraft tow tractor 1 is driven by a driver to a designated position below the aircraft 2 first, and then the end, opposite to the end connected to the voice receiving device 501, of the audio transmission line 4 is inserted into the headphone jack 202 in the cockpit of the aircraft 2 for wired connection.

After the aircraft tow tractor 1 is successfully connected to the aircraft 2 through the audio transmission line 4, flight crew gives a voice command of starting operation: the voice command is transmitted to the voice receiving device 501 via the audio transmission line 4 and is then transmitted to the voice processing device 502 from the voice receiving device 501: the voice processing device 502 capable of automatically recognizing and converting voices recognizes the voice command received by the voice receiving device 501 and converts the recognized voice command into a command which can be recognized by the vehicle-mounted motion controller 7: after that, the voice processing device 502 transmits the converted command to the vehicle-mounted motion controller 7: and after receiving this command, the vehicle-mounted motion controller 7 immediately controls the clamping device 101 on the aircraft tow tractor 1 to be reliably connected to the nose landing gear 3 on the aircraft 2.

After the clamping device 101 is reliably connected to the nose landing gear 3, the belly-mounted anti-collision light 201 is triggered to flicker continuously: at this moment, the vision acquisition device 601 acquires this visual information and transmits the acquired visual information to the vision processing device 602: the vision processing device 602 capable of processing and recognizing visual information converts the visual information acquired by the vision acquisition device 601 into a command which can be recognized by the vehicle-mounted motion controller 7, and then transmits the command to the vehicle-mounted motion controller 7: after receiving this command, the vehicle-mounted motion controller 7 sends corresponding signals to the aircraft tow tractor 1 and the voice recognition system 5, so as to inform a person working in the aircraft tow tractor 1 of the state of the belly-mounted anti-collision light 201 and inform the flight crew of the state of the belly-mounted anti-collision light 201 via the audio transmission line 4: if the command that the belly-mounted anti-collision light 201 flickers continuously is received, the next step will be carried out: otherwise, the next step will not be carried out, and it is necessary to check and eliminate a fault: and in this way, a cross validation based on the voice recognition system 5 and the visual recognition system 6 can be achieved.

If the voice command that the belly-mounted anti-collision light 201 flickers continuously is received, the aircraft tow tractor 1 has been reliably connected to the aircraft 2: in this case, the flight crew gives a voice command of starting taxiing: the voice command is transmitted to the voice receiving device 501 via the audio transmission line 4 and is then transmitted to the voice processing device 502 from the voice receiving device 501: the voice processing device 502 converts the voice command into a command which can be recognized by the vehicle-mounted motion controller 7 and then transmits the converted command to the vehicle-mounted motion controller 7: afterwards, the vehicle-mounted motion controller 7 controls the aircraft tow tractor 1 to tow the aircraft 2 for taxiing: when the voice command of starting taxiing is given, the taxi light 301 will flash: at this moment, the vision acquisition device 601 acquires visual information of the state of the taxi light 301 and then transmits the acquired visual information to the vision processing device 602: the vision processing device 602 converts the visual information into a command which can be recognized by the vehicle-mounted motion controller 7, and then transmits the command to the vehicle-mounted motion controller 7: after receiving this command, the vehicle-mounted motion controller 7 sends corresponding signals to the aircraft tow tractor 1 and the voice recognition system 5, so as to inform the person working in the aircraft tow tractor 1 of the state of the taxi light 301 and inform the flight crew of the state of the taxi light 301 via the audio transmission line 4; if the command that the taxi light 301 flashes is received, the aircraft tow tractor 1 tows the aircraft 2 to taxi; otherwise, the aircraft tow tractor 1 does not tow the aircraft 2 to taxi, and it is necessary to check and eliminate a fault: and in this way, a cross validation based on the voice recognition system 5 and the visual recognition system 6 can be achieved.

When the aircraft 2 is close to a stop position during taxiing, the flight crew gives a voice command of stopping taxiing: the voice command is transmitted to the voice receiving device 501 via the audio transmission line 4 and is then transmitted to the voice processing device 502 from the voice receiving device 501: the voice processing device 502 converts the voice command into a command which can be recognized by the vehicle-mounted motion controller 7, and then transmits the converted command to the vehicle-mounted motion controller 7: afterwards, the vehicle-mounted motion controller 7 controls the aircraft tow tractor 1 to stop towing: when the voice command of stopping taxiing is given, the taxi light 301 goes out: at this moment, the vision acquisition device 601 acquires visual information of the state of the taxi light 301 and then transmits the acquired visual information to the vision processing device 602: the vision processing device 602 converts the visual information into a command which can be recognized by the vehicle-mounted motion controller 7, and then transmits the command to the vehicle-mounted motion controller 7: after receiving this command, the vehicle-mounted motion controller 7 sends corresponding signals to the aircraft tow tractor 1 and the voice recognition system 5, so as to inform the person working in the aircraft tow tractor 1 of the state of the taxi light 301 and inform the flight crew of the state of the taxi light 301 via the audio transmission line 4: if the command that the taxi light 301 goes out is received, the aircraft tow tractor 1 stops towing the aircraft 2 to taxi: otherwise, the aircraft tow tractor 1 continuously tows the aircraft 2 to taxi: and in this way, a cross validation based on the voice recognition system 5 and the visual recognition system 6 can be achieved.

After the aircraft tow tractor 1 stops towing, the flight crew gives a voice command of disconnecting the clamping device 101 from the nose landing gear 3: the voice command is transmitted to the voice receiving device 501 via the audio transmission line 4 and is then transmitted to the voice processing device 502 from the voice receiving device 501: the voice processing device 502 recognizes the voice command received by the voice receiving device 501 and converts the recognized voice command into a command which can be recognized by the vehicle-mounted motion controller 7: after that, the voice processing device 502 transmits the converted command to the vehicle-mounted motion controller 7: after receiving this command, the vehicle-mounted motion controller 7 immediately controls the clamping device 101 on the aircraft tow tractor 1 to be disconnected from the nose landing gear 3 on the aircraft 2; then, the audio transmission line 4 is disassembled from the aircraft 2; and finally, the aircraft tow tractor 1 is driven to the designated position.

The above embodiments are only illustrative ones used to clearly explain the present disclosure rather than limit the implementations, and have embodied the substantive features and progress of the present disclosure. Those ordinarily skilled in the art can make different transformations or changes in other forms based on the above explanation. It is unnecessary and unable to exhaustively illustrate all possible implementations herein, and any apparent transformations or changes derived from this also fall within the protection scope of the present disclosure.

What is claimed is:

1. An intelligent system for controlling driving of an aircraft tow tractor by means of combination of voice and vision, being arranged on an aircraft tow tractor and an aircraft and comprising an audio transmission line, a voice recognition system, a visual recognition system, and a vehicle-mounted motion controller, wherein a clamping device is arranged in a middle of an upper portion of the aircraft tow tractor; a nose landing gear provided with a taxi light is arranged on a front portion of a bottom surface of the aircraft; a belly-mounted anti-collision light is located in a middle of the bottom surface of the aircraft;

the voice recognition system, the visual recognition system, and the vehicle-mounted motion controller are arranged on the aircraft tow tractor; the voice recognition system comprises a voice processing device as well as a voice receiving device connected to the vehicle-mounted motion controller through the voice processing device; the visual recognition system comprises a vision processing device as well as a vision acquisition device arranged on a top surface of a cab of the aircraft tow tractor and connected to the vehicle-mounted motion controller through the vision processing device, wherein a lens of the vision acquisition device faces towards the rear of the aircraft tow tractor; and the audio transmission line has one end connected to the voice receiving device and the other end detachably connected into a headphone jack in a cockpit of the aircraft;

wherein in response to receiving a voice command of starting operation given by a flight crew on the aircraft through the voice recognition system, the vehicle-mounted motion controller controls the clamping device on the aircraft tow tractor to be connected to the nose landing gear on the aircraft; after the clamping device on the aircraft tow tractor is connected to the nose landing gear on the aircraft, the belly-mounted anti-collision light is triggered to flicker continuously and the vision acquisition device acquires visual information of a state of the belly-mounted anti-collision light and transmits the visual information of the state of the belly-mounted anti-collision light to the vision processing device; in response to receiving the visual information of the state of the belly-mounted anti-collision light, the vision processing device converts the visual information of the state of the belly-mounted anti-collision light into a command which can be recognized by the vehicle-mounted motion controller and transmits the command to the vehicle-mounted motion controller; in response to receiving the command, the vehicle-mounted motion controller sends corresponding signals to the aircraft tow tractor and the voice recognition system to inform the flight crew of the state of the belly-mounted anti-collision light via the audio transmission line, so as to achieve a cross validation based on the voice recognition system and the visual recognition system;

after the vehicle-mounted motion controller sends the corresponding signals to the aircraft tow tractor and the voice recognition system to inform the flight crew of the state of the belly-mounted anti-collision light via the audio transmission line, the taxi light is triggered to flash and the vehicle-mounted motion controller is configured to receive a voice command of starting taxiing given by the flight crew, the vehicle-mounted motion controller controls the aircraft tow tractor to tow the aircraft for taxiing in response to receiving the voice command of starting taxiing through the voice recognition system, and the vision acquisition device acquires visual information of a state of the taxi light and transmits the visual information of the state of the taxi light to the vision processing device; in response to receiving the visual information of the state of the taxi light, the vision processing device converts the visual information of the state of the taxi light into a command which can be recognized by the vehicle-mounted motion controller and transmits the command to the vehicle-mounted motion controller; in response to receiving the command, the vehicle-mounted motion controller sends corresponding signals to the aircraft tow tractor and the voice recognition system to inform the flight crew of the state of the taxi light via the audio transmission line, so as to achieve the cross validation based on the voice recognition system and the visual recognition system; and when the aircraft is close to a stop position during taxiing, the taxi light is triggered to go out and the vehicle-mounted motion controller is configured to receive a voice command of stopping taxiing given by the flight crew, the vehicle-mounted motion controller controls the aircraft tow tractor to stop towing in response to receiving the voice command of stopping taxiing through the voice recognition system, and the vision acquisition device acquires visual information of the state of the taxi light and transmits the visual information of the state of the taxi light to the vision processing device; in response to receiving the visual information of the state of the taxi light, the vision processing device converts the visual information of the state of the taxi light into a command which can be recognized by the vehicle-mounted motion controller and transmits the command to the vehicle-mounted motion controller; in response to receiving the command, the vehicle-mounted motion controller sends corresponding signals to the aircraft tow tractor and the voice recognition system to inform the flight crew of the state of the taxi light via the audio transmission line, so as to achieve the cross validation based on the voice recognition system and the visual recognition system.

2. The intelligent system for controlling driving of an aircraft tow tractor by means of combination of voice and vision according to claim 1, wherein any one of a main control chip TMS570LS3137/TMS570LS1224, a development board EVAL-L9788, a main control chip SPC574K72E7/SPC582B60E3, and a vehicle control unit (VCU-P) can be adopted as the vehicle-mounted motion controller.

3. The intelligent system for controlling driving of an aircraft tow tractor by means of combination of voice and vision according to claim 1, wherein a Hikvision vision acquisition device DS-IPC-B12-I with 2 million pixels is adopted as the vision acquisition device.

4. The intelligent system for controlling driving of an aircraft tow tractor by means of combination of voice and vision according to claim 1, wherein the audio transmission line can be replaced with a wireless transmission device.

* * * * *